United States Patent Office 3,360,342
Patented Dec. 26, 1967

3,360,342
SODIUM TRIPOLYPHOSPHATE
Raimond Pals, Farmingdale, N.J., assignor to FMC Corporation, New York, N.Y., a corporation of Delaware
No Drawing. Filed May 28, 1965, Ser. No. 459,948
1 Claim. (Cl. 23—293)

ABSTRACT OF THE DISCLOSURE

Granular sodium tripolyphosphate particles larger than 100 mesh are treated by being struck with a striker element at a velocity of about 2,300 to 10,000 ft./min. in order to reduce the tendency of the particles to break down on handling into fines having a particle size smaller than 100 mesh.

---

This invention relates to sodium tripolyphosphate, and particularly to the treatment of sodium tripolyphosphate to reduce its tendency to break down into fine particles on handling.

Granular sodium tripolyphosphate, having a particle size on the order of −20 +100 U.S. Standard mesh, is a very important component of built detergent compositions, in which it serves to reinforce the deterging and cleansing properties of other components. It is used in typical home laundry compositions, dishwashing compositions, industrial cleansers, sanitizing cleansers and the like, which are produced both in granular and in tablet form.

Granular sodium tripolyphosphate has one important disadvantage, however. The granular material, having a particle size of about −20 to −100 mesh which is required for efficient formation of granular compositions with other additives and for preparation of uniform and strong tablets, tends to be friable. That is, on being handled, particularly in so-called airveying operations in which it is carried with air through various stages of the formulation process, its particles tend to break down to an objectionable extent into fine particles having a size of smaller than about 100 mesh.

The seriousness of this fines-creation problem has led to a variety of attempts to solve it. Some have involved changes in techniques employed in formulating the material. Others have involved chemical treatments to alter the nature of the sodium tripolyphosphate. No effective method which is both simple and inexpensive has been developed heretofore, however, and it therefore has remained desirable, and it is an object of this invention, to provide an effective method for reducing the tendency of granular sodium tripolyphosphate to break down into fine particles on handling.

I have now found that I am able to achieve this desirable end, minimizing the tendency of granular sodium tripolyphosphate particles having a particle size greater than 100 mesh to break down into fines having a particle size smaller than 100 mesh, by striking the granular particles with a hard, preferably metallic or hard plastic striker element at a velocity in excess of about 2,300 feet per minute, and preferably in the range of 2,300 to 10,000 ft./min.

Surprisingly, this treatment reduces the tendency of the sodium tripolyphosphate to break down into fines on subsequent handling, yet does not itself unduly increase the amount of fines in the granular material treated. This is particularly surprising when it is realized that a method heretofore used for densifying sodium tripolyphosphate, involving treating the sodium tripolyphosphate in a rotating drum or mechanical mixer in which a striking force is applied to the sodium tripolyphosphate through mixer blades or the like having a velocity of about 200–300 ft./min. is not effective in reducing the tendency of the granular material to break down into fines on subsequent handling, yet itself results in substantial attrition of the material into fines. The process of my invention, involving a very high speed striking of the granular sodium tripolyphosphate particles with a hard striker element does not produce any more fines than are produced by the slow speed densifying methods of the prior art, yet importantly does markedly reduce the tendency of the material subsequently to break down into fines.

The source of the granular sodium tripolyphosphate treated in accordance with my invention, and its method of manufacture, are not critical insofar as its ability to be improved by my process is concerned. The sodium tripolyphosphate can have been prepared by any method, for example by conventional drying of orthophosphate liquors and calcining in a rotary drier followed by crushing and screening to the desired granular size, compaction of sodium tripolyphosphate produced either in rotary-drying or spray-drying processes, followed by crushing and screening to the desired size, by fluid bed drying processes, and the like. Granular sodium tripolyphosphates from any source, having a particle size of on the order of −20 +100 mesh, are subject to breakdown into fines on mechanical handling such as in airveying or other handling, and all are improved by the treatment of my invention.

My high speed striking process can be carried out in any apparatus in which the granules of sodium tripolyphosphate are contacted by a hard striker element, preferably steel or other metal or hard plastic, moving at a speed of above about 2300 ft./min., and preferably in the range of 2300 to 10,000 ft./min. Striking the particles with an element moving at speeds slower than about 2300 ft./min. does not effect the desired improvement in friability resistance, whereas subjecting them to a striking element moving at greater than about 10,000 ft./min. causes excessive production of fines. The striking speed may be partially or all supplied by moving the sodium tripolyphosphate, as well as by movement of striker element.

One apparatus useful in carrying out this treatment is a blender comprising a tumbler having within the tumbler a high speed rotating element with striker bars, pins or blades which move at tip speeds of 2300–3900 ft./min. or more, the tumbler serving to pass the material being treated through the zone of action of the high speed rotating element. A suitable unit of this type is the Twin-Shell Blender having an intensifier bar sold by Patterson-Kelley Company of East Stroudsburg, Pa. Another useful apparatus is a so-called "Turbulizer" made by Strong-Scott Company of Minneapolis, Minn., which consists of a cylindrical shell surrounding a rotating shaft mounted with paddles. The material being treated is passed through the shell normally once, and subjected to the striking action of the paddles. This device can be operated at various speeds such that the tip speed of the paddles is at any desired speed within the herein range of about 2300 to 10,000 ft./min. Other apparatus for striking the granular particles with a mixer bar or other hard object at speeds within the herein range of 2300 to 10,000 ft./min. will suggest themselves, and it is not intended to limit the scope of this invention to any particular apparatus. Normally the apparatus is such as to maintain the granular particles within a confined space such that they are channeled into contact with the rapidly moving hard object.

The temperature at which my process is carried out is not critical, it being necessary only that the sodium tripolyphosphate not be at a temperature such as to embrittle the granules and thereby cause them to shatter into small particles on contact with the striker element, or at a temperature high enough so that they will tend to agglomerate. Useful temperatures therefore are anywhere between about 0° and about 350° C.

Likewise, the time for which the operation is carried out is not critical, and varies with the apparatus employed, the amount of material being treated and the susceptibility of the material to friability improvement. Normally the treatment is carried out for about 5 seconds to about 15 minutes.

Granular sodium tripolyphosphate treated in accordance with my invention has a greatly reduced tendency to form fines, that is, particles having a size smaller than 100 mesh. Normally sodium tripolyphosphate in granular form powders to the extent of about 10 to 20% or even more under actual use conditions, for example, in an airveying system in a compounder's plant. Products which powder, or produce fines, to the extent of much more than about 6% are objectionable, so that a real improvement in the ordinary granular sodium tripolyphosphate of commerce is required for the material to be entirely suitable for use in compounding granular and tableted compositions. The process of my invention provides such improved sodium tripolyphosphate.

At the same time, the treatment must not be such as itself to produce an undue amount of fines. Production of as much as 10 to 15% of fines in the friability-improving treatment is not objectionable commercially, it being possible to recover and reuse this amount of fines, for example, by compacting them into larger, granular particles. However, breakdown of much more than this amount of the granular material fed to the system is objectionable as not providing sufficient improved granular product and requiring an uneconomical amount of recirculation of fines to the compacting process.

The susceptibility of granular sodium tripolyphosphate to partial breakdown, its so-called "friability value" is readily determined by measuring the percentage increase in −100 mesh material produced by subjecting the granular material to a high velocity jet of air in a fluid bed. A 50 g. sample of the sodium tripolyphosphate having a particle size within the range of −20 +100 U.S. Standard mesh is fluidized for 10 minutes in a one-inch inside diameter 2-foot high glass tube fitted at the top with a Soxhlet extraction thimble and at the bottom with an air inlet and orifice plate, at an air flow of 0.25 standard cubic feet per minute which is achieved at an air pressure of 50 p.s.i.g. The sample is then removed from the glass tube and its content of particles smaller than 100 U.S. Standard mesh determined by screening on an appropriate sieve. The weight percentage of the material which is smaller than 100 mesh, and therefore which passes through the 100 mesh screen, is taken as the friability value. A product having a friability value of up to about 6% is satisfactory for use. Before being subjected to the friability test, all samples were screened to remove −100 mesh material.

The following examples are presented by way of illustration only and are not intended to limit the scope of my invention in any way. All percentages given are by weight.

EXAMPLE 1

Preparation of sodium tripolyphosphate (A) *Rotary calciner process.*—Phosphoric acid, sodium carbonate and water were reacted in sufficient quantities to give a sodium phosphate solution having a molar ratio of $Na_2O$ to $P_2O_5$ of 1.67:1 and a density of 53° Baume at 100° C. The solution was evaporated to dryness and the product further heated to about 500° C. in a rotary calciner. The hard agglomerates from the calciner were cooled, crushed and screened to separate the −20 +100 mesh granular fraction which was used in following Examples 2, 3 and the comparative examples. The friability value of this material as prepared was 12%.

(B) *Spray dried compacted.*—Sodium tripolyphosphate was produced from sodium phosphate solution prepared as described in Example 1A, but the solution was dried and calcined to sodium tripolyphosphate at 350° C. in a commercial spray-drier as described in U.S. Patent 2,898,189. The sodium tripolyphosphate produced thereby was compacted between high pressure compaction rolls at a hydraulic roll pressure of about 2,000 p.s.i., and the compacted particles were crushed and screened to yield a granular fraction, essentially all passing through a 20 mesh sieve and retained on a 100 mesh sieve. This material was used in Examples 4, 5 and the comparative example. It had a friability of 9%.

EXAMPLE 2

Granular sodium tripolyphosphate prepared as described in Example 1A was subjected in a Patterson-Kelley Twin Shell Blender to the striking action of a pin-studded intensifier bar having a tip speed of 2300 ft./min. Fifteen pounds of granular sodium tripolyphosphate was employed. After 15 minutes of this treatment the friability of the sodium tripolyphosphate was 6%, and the total fines (particles smaller than 100 mesh, which were removed before the friability test) produced by the treatment was 7%.

EXAMPLE 3

Granular sodium tripolyphosphate as prepared in Example 1A, having a friability of 12%, was treated in the Patterson-Kelley Twin Shell Blender equipped in this case with dispersion blades rotating at a tip speed of 3900 ft./min. The friability of the sample removed from the apparatus after 3 minutes was 6% while it had a fines content of 10%. The fines, particles smaller than 100 mesh, were removed before the friability test.

EXAMPLE 4

Granular sodium tripolyphosphate prepared as described in Example 1A was screened to separate a −20 +60 mesh granular fraction. The friability of this fraction was 10%. Fifteen pounds of this granular product were subjected to treatment in the Patterson-Kelley Twin Shell Blender with dispersion blades rotating at a tip speed of 3900 ft./min. as in Example 2. After 3 minutes of treatment the friability of the sample had improved to a value of 5.5%, and after 6 minutes it had improved to a value of 4.4%.

EXAMPLE 5

Compacted granular sodium tripolyphosphate prepared as described in Example 1B was subjected in the amount of 15 pounds to treatment in a Patterson-Kelley Twin Shell Blender equipped with dispersion blades rotating at a tip speed of 3900 ft./min. After 3 minutes in the apparatus, the product had a friability of 4.3%. Ten percent of fines having a particle size less than 100 mesh was produced by the treatment. These fines were removed before the friability test was run on the material.

EXAMPLE 6

Compacted granular sodium tripolyphosphate prepared as described in Example 1B was subjected to treatment in a Strong-Scott "Turbulizer." This device consists of a cylindrical shell surrounding a rotating shaft mounted with paddles. The granular sodium tripolyphosphate was run continuously through the Turbulizer with a retention time of about 5 seconds while the paddles were rotated at a tip speed of 3500 ft./min. The friability of the sodium tripolyphosphate following this treatment was 3%. About 12% of it was ground in the treatment to fines having a particle size smaller than 100 mesh. These fines were removed before the friability test was run.

When the paddle tip speed of the Turbulizer paddles was increased to 10,000 ft./min. the improvement in granular friability was still good, being reduced to 4%, but the material was attrited to fines in the amount of about 18%.

COMPARATIVE EXAMPLES

The granular sodium tripolyphosphate prepared by the method of Example 1A, having a friability of 12% as produced, when treated for 5 minutes in a 3-foot diameter commercial ribbon blender operating at 32 r.p.m. and having a mixer tip speed of 300 ft./min., had an unacceptable friability of 10%. Twenty percent of a powdered material having a particle size smaller than 100 mesh was produced by the treatment. Similar poor results were achieved when the granular sodium tripolyphosphate of Example 1 was treated in a conventional house kitchen Mixmaster having a blade speed of 200 ft./min. Samples removed after 10, 25 and 40 minutes of mixing showed essentially no improvement in friability (less than 1% improvement) with fines being produced in the amount of 29% in the 25 minute run and 41% in the 40 minute run.

The compacted sodium tripolyphosphate of Example 1B, having a friability of 9% also was treated in a low speed run employing a laboratory mixer having a bucket rotating in one direction with four paddles within the bucket rotating in the opposite direction. The tip speed of the paddles in this case was 125 ft./min. Friability was reduced to 8% from its original 9% in this treatment, after both 1 and 3 hours of treatment.

These comparative examples demonstrate that low speed mechanical striking of sodium tripolyphosphate granular particles produced essentially no improvement in the friability value of the material, while in some cases causing excessive breakdown of the materials into fines in the treatment.

The treatments of sodium tripolyphosphate carried out in accordance with the method of my invention on the other hand, as shown in Examples 2 through 6 resulted in production of a sodium tripolyphosphate having a markedly reduced tendency to break down into fines.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

A method of reducing the tendency of granular sodium tripolyphosphate particles larger than 100 mesh to break down on handling into fine particles smaller than 100 mesh, comprising contacting said granular sodium tripolyphosphate particles with a striker element at a velocity of from 2,300 to 10,000 ft./min.

References Cited

FOREIGN PATENTS 664,907    6/1963    Canada.

NORMAN YUDKOFF, *Primary Examiner.*

G. P. HINES, *Assistant Examiner.*